United States Patent
Baskey et al.

(10) Patent No.: US 6,345,327 B1
(45) Date of Patent: Feb. 5, 2002

(54) QUEUING METHOD AND APPARATUS FOR PROVIDING DIRECT DATA PROCESSING ACCESS USING A QUEUED DIRECT INPUT-OUTPUT DEVICE

(75) Inventors: Michael E. Baskey, Wappingers Falls; Frank W. Brice, Jr., Hurley; Steven G. Glassen, Wallkill; Eugene P. Hefferon, Poughkeepsie; Bruce H. Ratcliff, Red Hook, all of NY (US); Arthur J. Stagg, Raleigh, NC (US); Stephen R. Valley, Valatie, NY (US); Daniel F. Casper; Allan S. Meritt, both of Poughkeepsie, NY (US); Anthony R. Sager, Red Hook, NY (US); Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/253,247

(22) Filed: Feb. 19, 1999

(51) Int. Cl.[7] .......................... G06F 3/00; G06F 12/00; G06F 12/02; G06F 13/00
(52) U.S. Cl. .......................... 710/52; 710/53; 710/56; 710/57; 709/104; 709/213; 709/214; 709/215; 709/226
(58) Field of Search ................ 710/8, 10, 15, 710/52, 53, 56, 57; 709/104, 105, 213, 214, 215, 216, 220, 221, 222, 226; 713/1, 100

(56) References Cited

U.S. PATENT DOCUMENTS

| | | | | |
|---|---|---|---|---|
| 5,093,912 A | * | 3/1992 | Dong et al. | 709/104 |
| 5,912,889 A | * | 6/1999 | Preas et al. | 370/359 |
| 5,996,019 A | * | 11/1999 | Hauser et al. | 709/235 |
| 6,044,418 A | * | 3/2000 | Muller | 710/56 |
| 6,070,202 A | * | 5/2000 | Minkoff et al. | 710/56 |
| 6,282,589 B1 | * | 8/2001 | Porterfield et al. | 710/52 |

* cited by examiner

Primary Examiner—Thomas Lee
Assistant Examiner—Tanh Nguyen
(74) Attorney, Agent, or Firm—Floyd A. Gonzalez; Lily Neff

(57) ABSTRACT

A queuing method and apparatus for transfer or incoming and outgoing data in a network environment having a main storage is presented. A plurality of queue sets are provided in the main storage with at least one or more sets being dedicated for input and output. The queues can share access to a plurality of devices in the network across a plurality of communication stacks. Various network resources are mapped to the queues in order to facilitate resource allocation and dynamic configuration by providing initialization of a plurality of configuration parameters. In this way dynamic expanding and contracting of the number of queues in each set as dictated by traffic patterns and feedback indicators is provided.

25 Claims, 8 Drawing Sheets

| OFFSET | LENGTH | FUNCTION |
|---|---|---|
| 0 | 2 | LENGTH |
| 2 | 1 | CATEGORY |
| 3 | 1 | TYPE |
| 4 | 2 | DEV_CUA |
| 6 | 2 | DEV_NO |
| 8 | 1 | PRIORITY SERVICE ORDER |
| 9 | 1 | MAXIMUM SERVICE LIMIT UNITS |
| 10 | 2 | RESERVED |
| 12 | 4 | MAXIMUM SERVICE UNITS PRIORITY 1 |
| 16 | 4 | MAXIMUM SERVICE UNITS PRIORITY 2 |
| 20 | 4 | MAXIMUM SERVICE UNITS PRIORITY 3 |
| 24 | 4 | MAXIMUM SERVICE UNITS PRIORITY 4 |

NEW DEVICE ADDRESS SETUP SDU FIELD

FIG.4

REQUEST BLOCK THE COMMAND-REQUEST BLOCK FOR
STORE-SUBCHANNEL-QDIO DATA HAS THIS FORMAT:

| WORD 0 | '0010' | '0024' |
|---|---|---|
| 1 | 00000000 00000000 | FIRST SCH NUMBER |
| 2 | 00000000 00000000 | LAST SCH NUMBER |
| 3 | 00000000 00000000 | 00000000 00000000 |

0　　　　　　　　　16　　　　　　　　　31

FORMAT OF COMMAND-REQUEST BLOCK FOR
STORE-SUBCHANNEL-QDIO DATA.

FIG.5

RESPONSE BLOCK THE COMMAND-RESPONSE BLOCK
FOR THE STORE-SUBCHANNEL-QDIO-DATA COMMAND
HAS THIS FORMAT:

| WORD 0 | L2 | | RESPONSE CODE |
|---|---|---|---|
| 1 | C | RSVD. | 00000000 00000000 00000000 |
| 2 | | SUBCHANNEL | |
|  | | QDIO | |
|  | | DESCRIPTION BLOCK | |
| 10 | | • | |
|  | | • | |
| n | | • | |

0　1　　　8　　　　16　　　　　　　　31

FORMAT OF COMMAND-RESPONSE BLOCK FOR
STORE-SUBCHANNEL-QDIO DATA.

FIG.6

INPUT QUEUES

| CURRENT STATE | ACTIONS | NEW STATE |
|---|---|---|
| INPUT BUFFER NOT INITIAL. BUFFER OWNER: PROGRAM. | BY THE PROGRAM: ALLOCATE BUFFER. | INPUT BUFFER EMPTY. BUFFER OWNER: ADAPTER. |
| INPUT BUFFER EMPTY. BUFFER OWNER: ADAPTER. | BY THE ADAPTER: FILL BUFFER WITH DATA. | INPUT BUFFER PRIMED. BUFFER OWNER: PROGRAM. |
| INPUT BUFFER EMPTY. BUFFER OWNER: ADAPTER. | BY THE ADAPTER: FILL BUFFER WITH DATA. HALT SIGNAL TERMINATES TRANSFER. | INPUT BUFFER HALTED. BUFFER OWNER: PROGRAM. |
| INPUT BUFFER EMPTY. BUFFER OWNER: ADAPTER. | BY THE ADAPTER: ERROR DETECTED DURING BUFFER PROCESSING. | INPUT BUFFER ERROR. BUFFER OWNER: PROGRAM. |
| INPUT BUFFER PRIMED. BUFFER OWNER: PROGRAM. | BY THE PROGRAM: PROCESS BUFFER DATA. | INPUT BUFFER EMPTY. BUFFER OWNER: ADAPTER. |
| INPUT BUFFER PRIMED. BUFFER OWNER: PROGRAM. | BY THE PROGRAM: PROCESS BUFFER. UNALLOCATE BUFFER. | INPUT BUFFER NOT INITIAL. BUFFER OWNER: PROGRAM. |
| INPUT BUFFER HALTED. BUFFER OWNER: PROGRAM. | BY THE PROGRAM: APPLICATION DEPENDENT. | NOT APPL.. Q PROCESSING IS TERMINATED BY HSCH |
| INPUT BUFFER ERROR. BUFFER OWNER: PROGRAM. | BY THE PROGRAM: RECLAIM OR REPLACE BUFFER. | INPUT BUFFER EMPTY. BUFFER OWNER: ADAPTER. |

ALLOWED QDIO INPUT QUEUE BUFFER STATE TRANSITIONS.

FIG.7

OUTPUT QUEUES

| CURRENT STATE | ACTIONS | NEW STATE |
|---|---|---|
| OUTPUT BUFFER NOT INITIAL. BUFFER OWNER: PROGRAM. | BY THE PROGRAM: ALLOCATE AND FILL BUFFER. | OUTPUT BUFFER PRIMED. BUFFER OWNER: ADAPTER. |
| OUTPUT BUFFER EMPTY. BUFFER OWNER: PROGRAM. | BY THE PROGRAM: FILL BUFFER WITH DATA. | OUTPUT BUFFER PRIMED. BUFFER OWNER: ADAPTER. |
| OUTPUT BUFFER PRIMED. BUFFER OWNER: ADAPTER. | BY THE ADAPTER: TRANSMIT THE BUFFER DATA. | OUTPUT BUFFER EMPTY. BUFFER OWNER: PROGRAM. |
| OUTPUT BUFFER PRIMED. BUFFER OWNER: ADAPTER. | BY THE ADAPTER: TRANSMIT THE BUFFER DATA. HALT SIGNAL TERMINATES TRANSFER. | OUTPUT BUFFER HALTED. BUFFER OWNER: PROGRAM. |
| OUTPUT BUFFER PRIMED. BUFFER OWNER: ADAPTER. | BY THE ADAPTER: ERROR DETECTED DURING BUFFER PROCESSING. | OUTPUT BUFFER ERROR. BUFFER OWNER: PROGRAM. |
| OUTPUT BUFFER HALTED. BUFFER OWNER: PROGRAM. | BY THE PROGRAM: APPLICATION DEPENDENT. | NOT APPL.. Q PROCESSING IS TERMINATED BY HSCH. |
| OUTPUT BUFFER ERROR. BUFFER OWNER: PROGRAM. | BY THE PROGRAM: RECLAIM AND REFILL BUFFER WITH DATA. | OUTPUT BUFFER PRIMED. BUFFER OWNER: ADAPTER. |

ALLOWED QDIO OUTPUT QUEUE BUFFER STATE TRANSITIONS.

| | 0 | QFMT | PFMT | RESERVED | |
|---|---|---|---|---|---|
| | 1 | RESERVED | | | |
| | 2 | RESERVED | | | |
| | 3 | 0 | FIRST INPUT SLIB ADDRESS | | |
| | 4 | RESERVED | | | |
| | 5 | 0 | FIRST OUTPUT SLIB ADDRESS | | |
| | 6 | RESERVED | | | |
| | 7 | | | | |
| | 8 | ADAPTER IDENTIFIER | | | |
| | 9 | | | | |
| | 10 | RESERVED | | | |
| | 31 | | | | |
| | 32 | IMPLEMENTATION DEPENDENT PARAMETERS | | | |
| | 63 | | | | |

0 1      8      16      24      31

QUEUE-INFORMATION BLOCK (QIB)

FIG.13

WORD

| 0 | FLAGS | RESERVED | SBALF |
|---|---|---|---|
| 1 | RESERVED | DATA COUNT | |
| 2 | RESERVED | | |
| 3 | 0 | DATA ADDRESS | |

0 1      16      24      31

STORAGE-BLOCK-ADDRESS-LIST ENTRY (SBALE)

FIG.14

WORD

| 0 | SQB0 | SQB1 | SQB2 | SQB3 |
|---|---|---|---|---|
| 1 | • | | | |
| 30 | • | | | |
| 31 | SQB124 | SQB125 | SQB126 | SQB127 |

0      8      16      24      31

STORAGE-LIST-STATE BLOCK

FIG.11

STORAGE-LIST-INFORMATION-BLOCK ENTRY (SLIBE)

| WORD | | |
|---|---|---|
| 0 | RESERVED | |
| 1 | IMPLEMENTATION-DEPENDENT PARAMETERS | |
| | 0           8 | 31 |

FIG.12

STORAGE LIST

| WORD | | | |
|---|---|---|---|
| 0 | RESERVED | | |
| 1 | 0 | SBAL 0 ADDRESS | |
| ... | | | |
| 254 | RESERVED | | |
| 255 | 0 | SBAL 127 ADDRESS | |
| | 0 1 | | 31 |

FIG.10

STORAGE-LIST-INFORMATION BLOCK (SLIB)

| WORD | | | |
|---|---|---|---|
| 0 | RESERVED | | |
| 1 | 0 | NEXT SLIB ADDRESS | |
| 2 | RESERVED | | |
| 3 | 0 | STORAGE-LIST ADDRESS | |
| 4 | RESERVED | | |
| 5 | 0 | STORAGE-LIST-STATE-BLOCK ADDRESS | |
| ... | RESERVED | | |
| 256 | | | |
| 257 | STG.-LIST-INFO.-BLOCK ELEMENT 0 | | |
| ... | | | |
| 510 | | | |
| 511 | STG.-LIST-INFO.-BLOCK ELEMENT 127 | | |
| | 0 1       8 | | 31 |

QUEUING METHOD AND APPARATUS FOR PROVIDING DIRECT DATA PROCESSING ACCESS USING A QUEUED DIRECT INPUT-OUTPUT DEVICE

FIELD OF INVENTION

The subject of the present invention in general pertains to a new Input-Output facility design that exploits high bandwidth integrated network adapters.

BACKGROUND OF THE INVENTION

In a network computing environment, multitudes of commands and requests for retrieval and storage of data are processed every second. To properly address the complexity of routing these commands and requests, environments with servers have traditionally offered integrated network connectivity to allow direct attachments of clients such as Local Area Networks (LANs). Given the size of most servers, the number of clients usually is in the range of hundreds to thousands and the bandwidth required in the 10–100 Mbits/sec range. However, in recent years the servers have grown and the amount of data they are required to handle has grown with them. As a result, the existing I/O architectures need to be modified to support this order of magnitude increase in the bandwidth.

In addition, new Internet applications have increased the demand for improved latency. The adapters must support a larger number of users and connections to consolidate the network interfaces which are visible externally. The combination of all the above requirements presents a unique challenge to server I/O subsystems.

Furthermore, in large environments such as International Business Machines Enterprise System Architecture/390 (Enterprise System Architecture/390 is a registered trademark of International Business Machines Corporation), there are additional requirements that the I/O subsystem must remain consistent with existing support. Applications must continue to run unmodified, and error recovery and dynamic configuration must be preserved or even improved. Sharing of I/O resources must be enabled as well as the integrity of the data being sent or received. This presents new and complex challenges that need to be resolved.

In order to achieve bandwidths which are dramatically higher and still achieve other required challenges, a new system architecture is needed.

This application is related to the following copending applications: PO9-99-013, Ser. No. 09/253,246; PO9-99-014, Ser. No. 09/253,250; PO9-99-016, Ser. No. 09/253,248; PO9-99-017, Ser. No. 09/252,712; PO9-99-018, Ser. No. 09/252,552; PO9-99-019, Ser. No. 09/252,728; PO9-99-020, Ser. No. 09/252,730; PO9-99-021, Ser. No. 09/253,101; PO9-99-022, Ser. No. 09/253,286; PO9-99-023, Ser. No. 09/252,542; PO9-99-024, Ser. No. 09/253,249; PO9-99-025, Ser. No. 09/252,556; PO9-99-026, Ser. No. 09/253,993; PO9-99-027, Ser. No. 09/253,658; PO9-99-028, Ser. No. 09/252,555; PO9-99-029, Ser. No. 09/255,641; PO9-99-030, Ser. No. 09/255,640; and PO9-99-031; Ser. No. 09/252,727.

SUMMARY OF THE INVENTION

A queuing method and apparatus for transfer or incoming and outgoing data in a network environment having a main storage is presented. A plurality of queue sets are provided in the main storage with at least one or more sets being dedicated for input and output. The queues can share access to a plurality of devices in the network across a plurality of communication stacks. Various network resources are mapped to the queues in order to facilitate resource allocation and dynamic configuration by providing initialization of a plurality of configuration parameters. In this way dynamic expanding and contracting of the number of queues in each set as dictated by traffic patterns and feedback indicators is provided.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 2 is an illustration of a network computing environment as per one embodiment of the present invention; FIG. 2A shows how the use of some channel and control unit functions while

FIG. 4 illustrates SETUP SDU fields;

FIG. 5 represents the format for the command request block for store-subchannel-QDIO data;

FIG. 6 represents the format for the command response block for the store-subchannel-QDIO data command;

FIG. 7 is a tabular illustration of the contents of input queues as per one embodiment of the present invention;

FIG. 8 is a tabular illustration of the contents of output queues as per one embodiment of the present invention;

FIG. 9 is an example of a queue information block content as per one embodiment of the present invention;

FIG. 10 is an example of a SLIB block content as per one embodiment of the present invention;

FIG. 11 is an example of a SLIBE block content as per one embodiment of the present invention;

FIG. 12 is an example of a Storage List content as per one embodiment of the present invention;

FIG. 13 is an example of a SBALE content as per one embodiment of the present invention; and FIG. 14 is an example of a Storage-List-State-Block content as per one embodiment of the present invention.

DETAILED DESCRIPTION OF THE INVENTION

Figure 1:
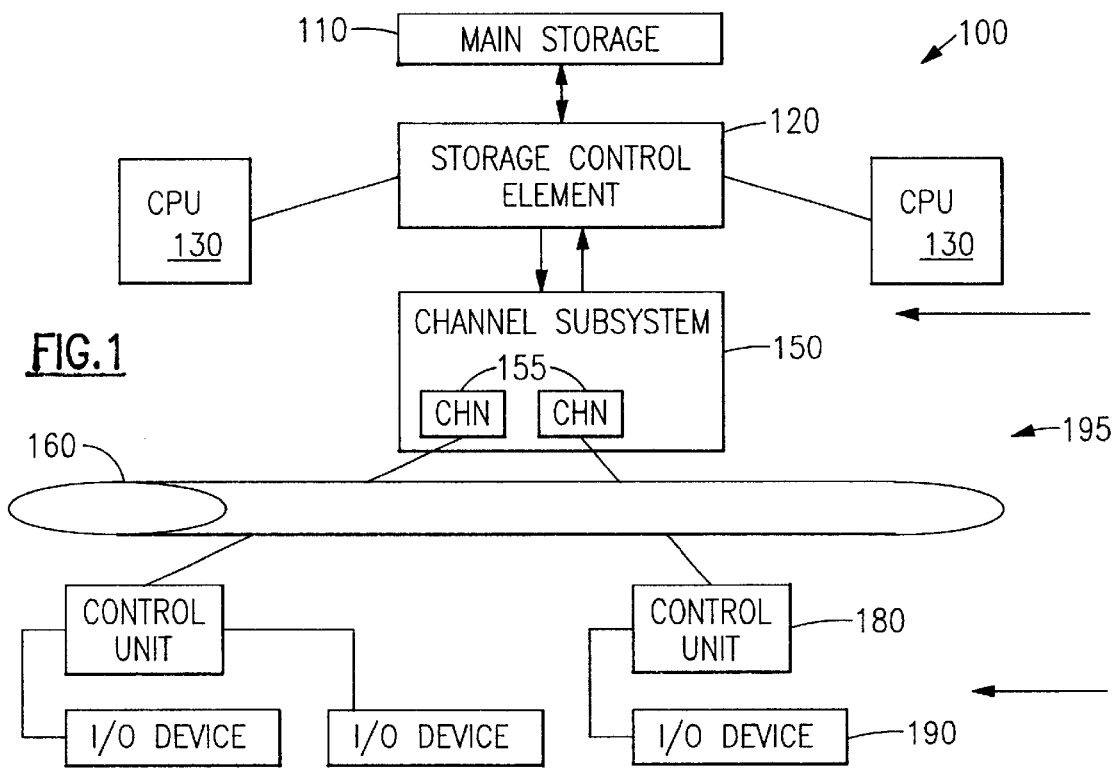
FIG. 1 is an illustration of a network computing environment utilizing a channel subsystem and a control unit.

An example of an existing data processing system architecture is depicted in FIG. 1. As shown in FIG. 1, information is passed between the main storage 110, and one or more input/output devices (hereinafter I/O devices) 190, using channel subsystems 150. Through the switch 160, channel paths are established, comprising channels 155 and one or more control units shown at 180. These channel paths are the communication links established between the I/O devices 190 and the main storage for processing and exchange of information.

The main storage 110 stores data and programs which are input from I/O devices 190. Main storage is directly addressable and provides for high speed processing of data by central processing units and one or more I/O devices. One example of a main storage is a customer's storage area and a system area (not shown). I/O devices 190 receive information or store information in main storage. Some examples of I/O devices include card readers and punches, magnetic-tape units, direct-access storage devices (DASD), displays, keyboards, printers, teleprocessing devices, communication controllers and sensor-based equipment.

The main storage is coupled to the Storage Control Element (SCE) 120 which in turn is coupled to one or more central processing units (CPU) 130. The central processing unit(s) is the control center of the data processing system and typically comprises sequencing and processing facilities for instruction execution, initial program loading and other related functions. The CPU is usually coupled to the SCE via a bi-directional or uni-directional bus. The SCE, which controls the execution and queuing of requests made by the CPU and channel subsystem, is coupled to the main storage, CPUs and the channel subsystem via different busses.

The channel subsystem directs the flow of information between I/O devices and main storage and relieves the CPUs of the task of communicating directly with the I/O devices so that data processing operations directed by the CPU can proceed concurrently with I/O processing operations. The channel subsystem uses one or more channel paths as the communication links in managing the flow of information to or from I/O devices. Each channel path consists of one or more channels, located within the channel subsystem, and one or more control units. In one preferred embodiment, a SAP I/O processor is also included as part of the channel subsystem.

As can be seen in FIG. 1, it is also possible to have one or more dynamic switches or even a switching fabric (network of switches) included as part of the path, coupled to the channel(s) and the control unit(s). Each control unit is further attached via a bus to one or more I/O device(s).

The subchannel is the means by which the channel subsystem provides information about associated I/O devices to the central processing units; the CPUs obtain this information by executing I/O instructions. The subchannel consists of internal storage that contains information in the form of a channel command word (CCW) address, channel path identifier, device number, count, status indications, and I/O interruption subclass code, as well as information on path availability and functions pending or being performed. I/O operations are initiated with devices by executing I/O instructions that designate the subchannel associated with the device.

The execution of input/output operations is accomplished by the decoding and executing of CCWs by the channel subsystem and input/output devices. A chain of CCWs (input/output operations) is initiated when the channel transfers to the control unit the command specified by the first channel command word. During the execution of the specified chain of I/O operations, data and further commands are transferred between the channel(s) and the control unit(s).

As explained earlier, in order to achieve bandwidths which are dramatically higher and move from 100 Mbits to Gbit technologies, a combination of improvements is required.

Figure 2A:
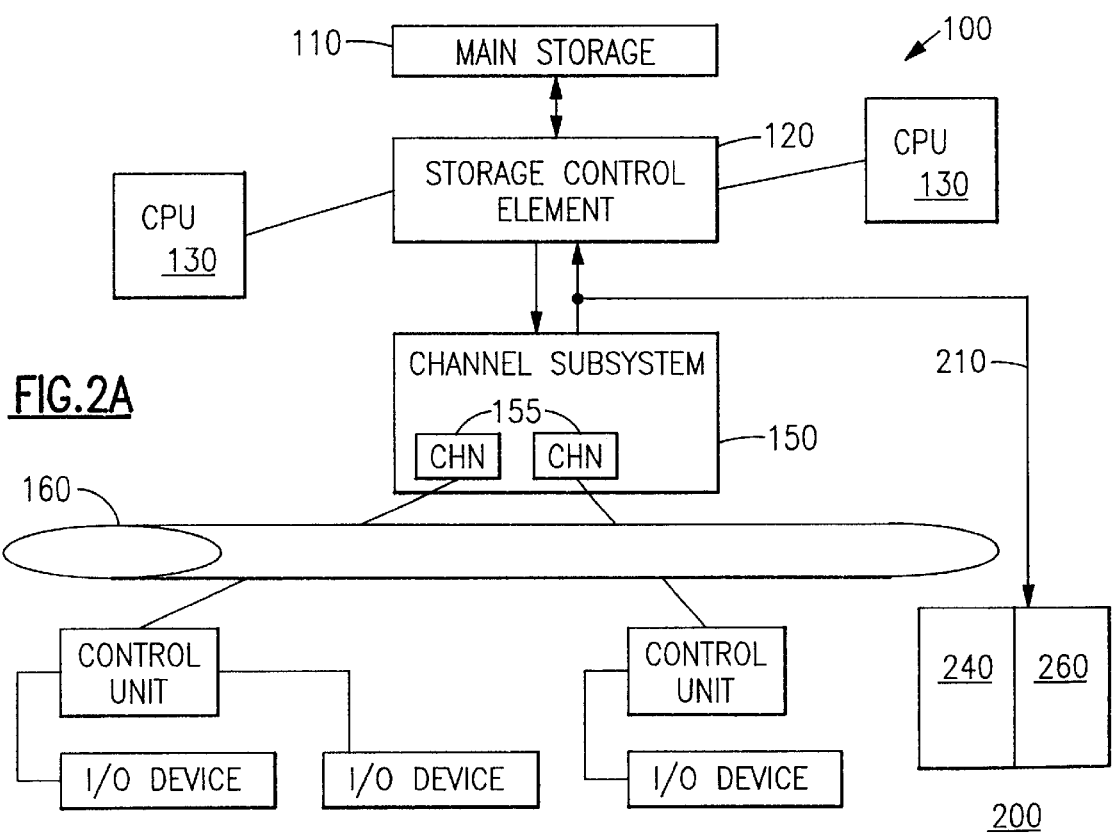

FIG. 2 depicts the network environment of the present invention. FIG. 2A depicts how the existing channel subsystem and control units is replaced by an Interface element as shown at 200 along the path 210. A Connector Interface Element and a Network Interface Element are also components of the Interface element as shown at 240 and 260 respectively. The present invention still allows the use of most programming and code structure of the existing architecture, but provides a much faster and more efficient system by bypassing the need for addressing many of the existing required functions such as the multitudes of channel commands, by eliminating the need for many processing steps.

Figure 2B:
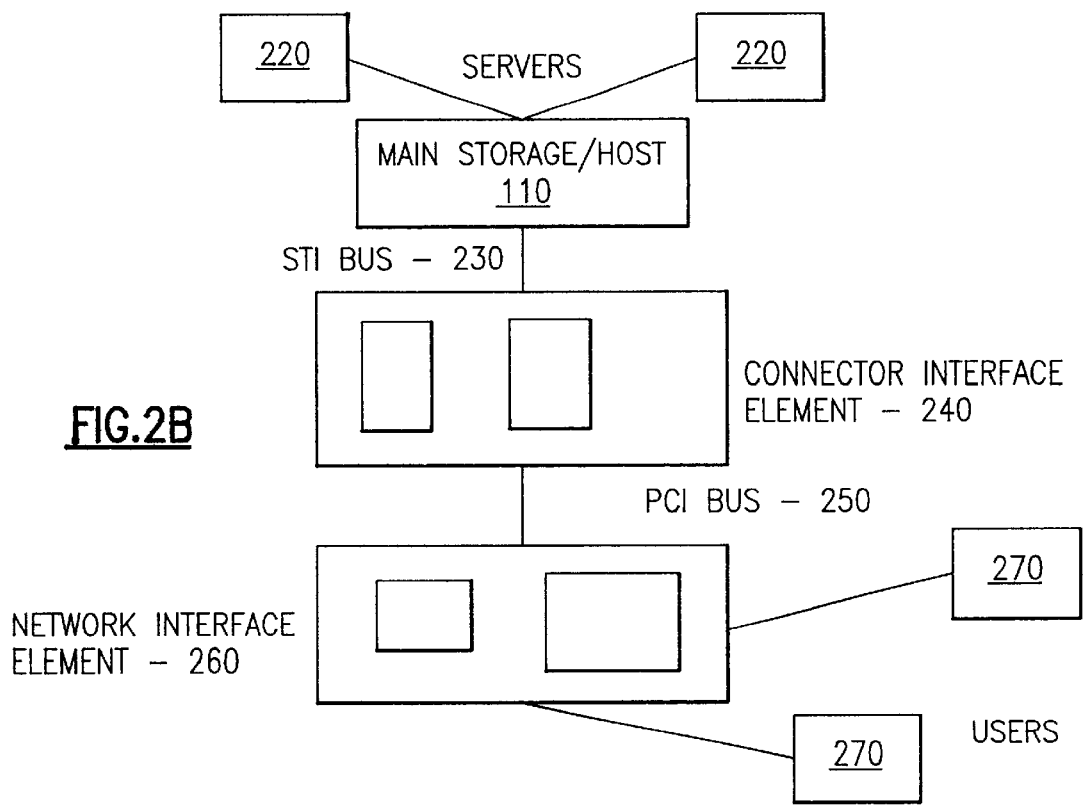
FIG. 2B shows the details of the Interface element.

The architecture of the present invention can be better depicted in the configuration represented by FIG. 2B. The Connector Interface Element shown at 240 can include a plurality of processors, at least one of which is used for redundancy purposes and bus interface cards. An direct memory attached I/O device such as a Self-Timed Interface bus, hereinafter STI bus (shown at 230) as used in one embodiment of the present invention, connects the Connector Interface element to the main storage 110 (also referenced to as the host) which in turn can be connected to a variety of other network elements and servers shown at 220 such as web-servers and other TCP/IP oriented servers. The Connector Interface Element is in processing communication with the Network Interface Element shown at 260 via another direct memory attached I/O device such as a Peripheral Controller Interface bus, hereinafter PCI bus as shown at 250 as used in one embodiment of the present invention. The I/O device adapters, at least one or more processors and some local storage reside in the Network Interface Element. Consequently, the Network Interface Element is connected to individual application users depicted at 270 such as Lotus Notes clients and Web browsers.

Data streams and requests for retrieval of data from servers by the application users is transferred via the Interface Element to the main storage where a plurality of queues can be setup for processing and storage of the data while providing the advantage of bypassing any need for causing an interrupt in the main program. The status of the network is then updated to reflect the changes. Once the appropriate response or data is retrieved from the servers, these multiple queues are interrogated simultaneously to determine the appropriate application server that the data needs to be sent to. Subsequently, data from the servers is also transmitted via the Interface Element to the application users in the same manner by establishing and interrogating the queues.

The queuing mechanism needs to be explained in more detail. The queuing mechanism of the present invention is referenced to as the Queued Direct I/O (QDIO) facility and comprises communication stacks. The input and output queues or both may be provided. When the QDIO input queues are provided, the program can directly access data placed into the input queues by the adapter(s) of the Interface Element. Typically, the source of the data placed into such input queues originates from an I/O device or network of devices to which the adapter is connected. Correspondingly, when the QDIO output queues are provided, the program can transmit data directly to the adapter by placing data into the appropriate output queues. Depending on the adapter, the data placed into such output queues may be used internally by the adapter or may be transmitted to one or more I/O devices to which the adapter is connected.

The build in queues set are located in the program storage and are separate from the data control traffic. In a preferred embodiment up to 240 queue sets are provided. A direct adapter storage interface is also provided to minimize interrupts and other overhead. Each queue set in the mechanism provides for separate outbound and inbound queues; in one preferred embodiment, four outbound and at least one inbound queue. Each application is assigned to at least one queue set which comprises a number for input or output queues, and each queue set can share one or more adapters. The queue sets provide for a list of useable buffers and also a list of storage blocks for incoming/outgoing data. The buffers are further prioritized to address specific application needs. At initialization time and subsequently when desired or a change is required, queues are initiated for each application(s). Queues are naturally static at initialization time when they are flexibly defined but as new applications are being assigned, the queuing becomes dynamic and updates are made at intervals or continuously, as desired, to reflect the latest nature of them.

For both QDIO input and output queues, main storage is used as the medium by which data is exchanged between the program and the adapter. Additionally, these queues provide the ability for both the program and the adapter to directly communicate with each other in an asynchronous manner which is both predictable and efficient without requiring the services of a centralized controlling mechanism, such as an Operating System Input/Output Supervisor, and the resulting overhead such a control mechanism implies. Both input and output queues are constructed in main storage by the program and are initialized and activated at the QDIO adapter, as described below. Each queue consists of multiple separate data structures, called queue components, which collectively describe the queues' characteristics and provide the necessary controls to allow the exchange of data between the program and the adapter.

A Queuing status block is established to reflect the changes dynamically as per the changing I/O activity status. The queues comprise buffers which reflect channel ownership in the channel subsystem, and the ownership also gets updated as the picture dynamically changes. The queue sets are connected via the adapter to the host/main storage. In one preferred embodiment where separate images are provided for virtual systems, each virtual system can also be assigned a separate queue set in the queuing mechanism.

Exchange of Data

The program and the QDIO adapter use a state change signalling protocol in order to facilitate the exchange of data. This protocol is applied to each input and output data buffer associated with each of the active input and output queues. Both input and output buffers are managed and exchanged between the program and the adapter by placing the buffer into various states which are maintained in a special location that is set aside and is associated with each buffer. For example for input queues, asynchronous to the execution of the program, the QDIO adapter places data received from the associated I/O device into input buffers that are in the input buffer empty state. For each input buffer that has data placed into it by the adapter, the state of the buffer is changed from input buffer empty to input buffer primed. The program then examines in sequence (such as round robin) the state of all input buffers associated with all QDIO input queues and processes the data in each input buffer that is in the input buffer primed state. Upon completion of input buffer processing, the program may change the state of the buffer to input buffer empty in order to make the buffer available for reuse by the adapter for subsequent input data from the attached I/O device. When the program changes the state of one or more input queue buffers from primed to empty, it executes a SIGNAL ADAPTER instruction which designates the read function in order to signal the adapter that one or more input buffers are now available for use.

Similarly, for output queues, asynchronous to the execution of the QDIO adapter, the program places output data into one or more QDIO output queue buffers that are in the output buffer empty state, output buffer not initialized state, or output buffer error state and then changes the state of each such buffer to the output buffer primed state. The program executes a Signal Adapter instruction which designates the write function in order to signal the adapter that one or more output queues now have data to be transmitted to the I/O device attached to the adapter. Asynchronous to the execution of the program, the QDIO adapter transmits the data in each QDIO output buffer that is in the output buffer primed state to the attached I/O device. Upon completion of transmission, the adapter changes the state of each such buffer to the output buffer empty state in order to make the buffer available for reuse by the program.

Additionally, each data buffer also has an ownership state which identifies either the program or the adapter as the controlling element of the buffer for the period of time that element is responsible for managing and processing the buffer. Additionally, the queuing mechanism provides for a prioritization scheme for the queues. Device addresses are used as queue anchors, retaining I/O heritage to reduce cost.

Queue Components

Figure 3:
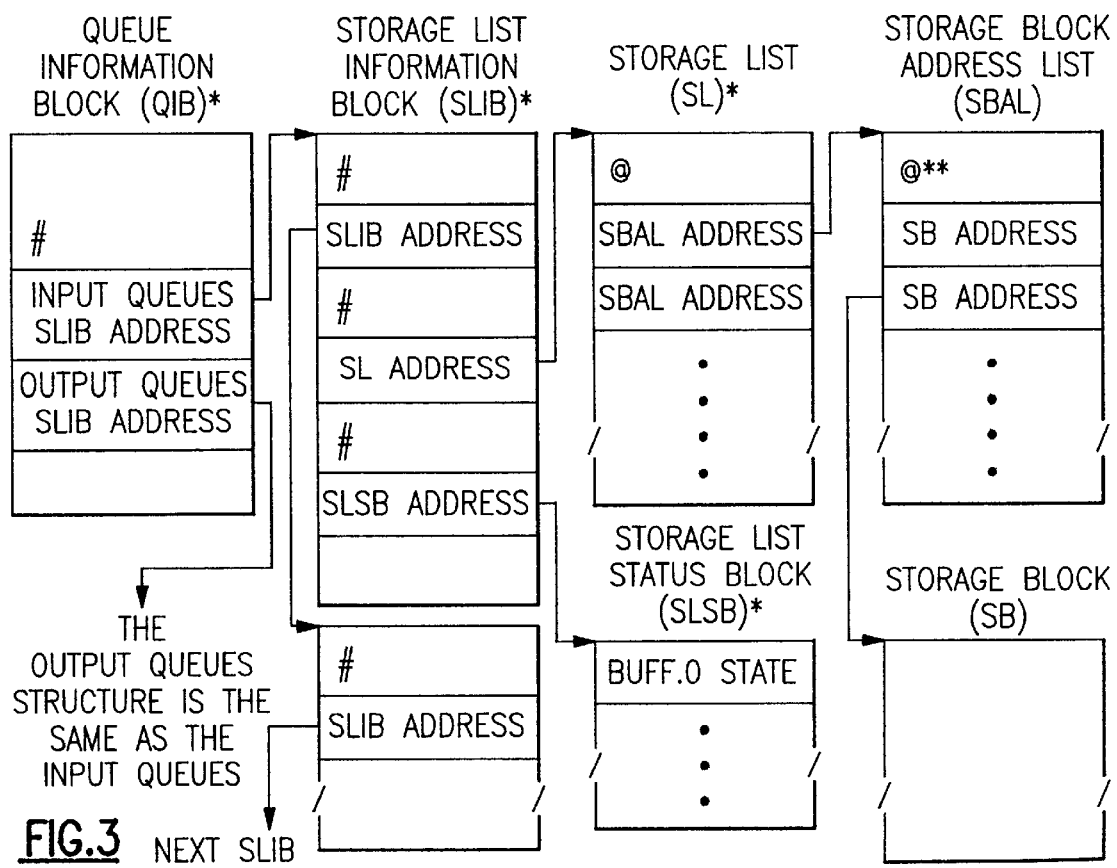
FIG. 3 is an illustration of a queuing mechanism as per one invention of the present invention.

FIG. 3 depicts the control structure overview for the input and output queues associated with a QDIO subchannel. FIG. 3 also demonstrates the queue components as defined for the present invention. The Queue Information Block (QIB) contains information about the collection of QDIO input and output queues associated with a given subchannel. It provides information for collection of input and output queues for the adapter associated with the subchannel. One QIB is defined per QDIO subchannel; FIG. 9 provides the format of queue-information block as per one embodiment of the present invention.

The Storage List Information Block (SLIB) provides for the address of information stored pertaining to each queue. One SLIB is defined for each queue. SLIB contains information about a QDIO queue and has a header and entries called storage-list-information-block entries containing information about each of the buffers for each queue. FIG. 10 provides SLIB format as per one embodiment of the present invention. Furthermore, a storage list information block element or SLIBE can be provided containing information regarding the QDIO data buffer as determined by the corresponding SL entry. FIG. 11 depicts a sample SLIBE content.

The Storage List or SL defines the SBAL or storage block address lists that are defined for each I/O buffers associated with each queue. One SL is defined for each queue which contains an entry for each QDIO-I/O buffer associated with the queue. SL provides information about the I/O buffer locations in main storage. As per one embodiment of the present invention, FIG. 12 provides a sample SL content. SL also provides the absolute storage address of a storage block address list. In turn, SBAL contains a list of absolute addresses of the storage blocks that collectively make up one of the data buffers associated with each queue. A storage block address list entry or SBALE is also provided as part of each SBAL. Each SBALE contains the absolute storage address of a storage block. Collectively, the storage blocks addressed by all of the entries of a single SBAL constitute one of the many possible QDIO buffers of a QDIO queue. In a preferred embodiment, the number of these possible QDIO buffers equal 128. FIG. 13 provides for the format of a SBALE as provided by one embodiment of the present invention. SBALF or SBAL Flags contain information about the overall buffer associated with the SBAL containing each SBALE, and not just about the storage block associated with each SBALE. The description of contents of the SBALF field is different for each SBALE within the SBAL.

A Storage-List-State Block or SLSB contains state indicators that provide state information about the QDIO buffers that make up a queue. A QDIO buffer consists of the collection of storage blocks that can be located using all of the addresses in a single storage-block-address list. Depending on the current state value in an SLSB entry, either the program or the QDIO control unit can change the state of the corresponding QDIO buffer by storing a new value in the entry. FIG. 14 provides a sample SLSB format as per one embodiment of the present invention. SLSB also provides for a SQBN or state of queues buffer N which provides the current state of the corresponding QDIO buffer. The QDIO buffer that corresponds to a given SLSB entry is determined by the storage list entry having the same sequential position in the storage list as the SQBN field has in the SLSB. In one embodiment, the state value consists of two parts, bits 0–2 indicate whether the buffer is owned by the program or the QDIO control unit and whether the buffer is an input or output buffer. Bits 3–7 contain a value that indicates the current processing state of the buffer. In this embodiment different bits can also be identified to mean different configurations. For example, bit zero can be established to indicates program ownership, while bits 1 and 2 provide for QDIO control unit ownership and buffer type respectively. Bits 3–7 can contain a binary value that indicates the current processing state of the associated buffer such as empty (available for data storage), primed (available to be processed), not initialized (not available for use), or halted (contains valid data but data transfer was prematurely halted by program executing Halt Subchannel), and Error (associated buffer is in an error state and contents of buffer are not meaningful).

Storage Blocks or SBs are storage blocks that are defined collectively to define a single I/O buffer.

The overall process by which QDIO queues are used to exchange data between the program and a QDIO adapter is as follows:

1) The program constructs one or more input queues and/or output queues in main storage. The maximum number of such queues that a QDIO recognizes depends on the type and model of the adapter. These limits can be used by a CHCS or Store_Subchannel_QDIO_data command.

2) The program transmits the main storage location of each input or output queue to the QDIO adapter by use of an establish_QDIO_Queues channel command. To accomplish this, a Start Subchannel command instruction is also executed which designates a QDIO subchannel that is associated with the QDIO adapter.

3) Upon successful completion of the establish_QDIO_queues command, the program then activates the queues at the QDIO adapter by executing an activate_QDIO_queues channel command. Upon its successful completion, the subchannel is placed into the subchannel-active state and the QDIO-active state. Again a Start Subchannel is used to accomplish this. Alternatively, the active_QDIO-queues command may be command chained to a previous establish_QDIO-queues command when Start Subchannel is executed in the previous step.

4) Upon activation of the queues, both the program and the adapter can asynchronously transmit data to each other by appropriate use of the queues as long as the designated subchannel, with which the queues are associated, remains in a sub-channel active and QDIO-active state.

5) Any action that causes a QDIO subchannel to exit the subchannel_active and QDIO-active states causes the QDIO adapter to stop examining and processing all queues associated with the subchannel. This includes: a program initiated action such as clear or halt subchannel that designates a QDIO subchannel, an error condition (including errors within QDIO adapter, the channel subsystem or elsewhere in the central processing complex that affects the state of a QDIO subchannel) that causes a QDIO-active subchannel to enter a status pending with alert-status state, or a reset/reconfiguration action initiated by the program or operator that affects the ability of the QDIO adapter to process QDIO subchannels or their queues, such as a deconfigure-channel-path command that deconfigures the only available QDIO-channel path to which a QDIO subchannel is associated.

The design of the present invention provides the ability to share access to this device across multiple communication stacks, multiple priorities and multiple virtual guests and/or multiple logical partitions. A new mechanism for mapping various resources to queues which are serviced by the microcode is devised to facilitate resource allocation and dynamic configuration, including single point of definition. This new mechanism includes a new control path interface to facilitate initialization of the configuration parameters and the queue structure(s). This includes dynamic expanding of the number of queues and queue elements as traffic patterns and feedback indicate. The organization of control blocks is critical to minimize the amount of data which needs to be translated across the various software layers, given virtual addressing constraints relative to page fixings as required by the I/O.

As the data comes in through the adapter, a buffer is assigned to it and in this way, cache pollution is avoided. The channel subsystem in this configuration still operates in the traditional mode for the control flow but in the new manner explained above for data flow providing an interrupt free outbound traffic. The inbound traffic has to allow for interrupts. For the inbound traffic, it is not always obvious as when the data arrives exactly and the mechanism allows for selective use of interrupts. In one embodiment there is even an adaptive rate established between the interrupts and the polling rate. Hence, inbound interrupts only take place during low data rates.

Queue Priority and Sequencing

Both input and output queues are processed by a QDIO adapter in priority sequence as follows:

1) The lowest numbered queue has the highest priority and the highest numbered queue has the lowest priority.

2) For output queues, the adapter processes primed state buffers for the highest priority output queue before processing buffers associated with the next highest priority output queue.

3) For input queues, adapter processing is dependent on the type of QDIO channel path to which it is configured. For adapters configured to OSADE channel paths, the adapter processes incoming data according to the inherent priority of the data, placing the data into empty state buffers of the queue with the associated priority.

4) Depending on the type of QDIO adapter and the model, input queues may have priority over output queues, vice versa, or no defined priority may exist between the two.

5) For both input and output queues, each queue is processed in a sequential round robin manner starting with the buffer associated with SBAL 0, called buffer 0, and continuing until the buffer associated with the last SBAL or buffer, is processed at which point processing starts again with buffer 0.

For input queues, each buffer in the input buffer empty state is sequentially processed until the adapter encounters a buffer that is not in the empty state or no more input data is received. The adapter then processes the non-empty state buffer by looking at whether the input buffer is primed, input buffer not initialized, or input buffer error state is detected. When it sees an adapter in any of these states, the process of scanning the remaining queues entries is suspended until either an interval or time has elapsed, a SIGNAL ADAPTER read function is executed, or additional input from the device or network of devices is detected. This process is continued until the buffer reaches an input buffer empty state at which time it is processed and the adapter resumes the sequential processing of the remaining queues entries. If the Input buffer is in any other state, the adapter terminates the processing of all queues for the associated QDIO subchannel.

For output queues, each output buffer primed state buffer is sequentially processed until the adapter encounters a buffer that is not in the primed state or until a model dependent "fairness" algorithm causes the adapter to process the next lower priority output queue. When an output buffer that is not in the output buffer primed state is detected, the adapter processes the non-primed state buffer as follows. When the output buffer is empty, output buffer is not initialized or is in an error state, the adapter suspends the process of scanning until an interval has passed or a SIGNAL ADAPTER write function is executed. Depending on the model, when one or more of these events occur, the adapter again accesses the SLSB entry for the same I/O buffer that was previously detected as being in one of these states, the adapter again suspends processing of that queue. If the buffer is now in the output buffer primed state, the buffer is processed and the adapter resumes the sequential processing of the remaining queue entries. If the output buffer is in any other state, the adapter terminates the processing of all queues for the associated QDIO subchannel.

The above configuration provides for interlock data movement avoidance between the queue mechanism where the application can place network data on a queue which can be accessed too easily. The initiative and/or control is passed for the queues between the server software and the microcode as to avoid unnecessary interrupts where ownership of queues is passed back and forth and unnecessary data movements where ownership of data is transferred back and forth under guaranteed interlock to eliminate out of order updates. All updates of both the shared states and queues must be in absolute synchronization. There is also a shared state interface control or SSIC mechanism used to control logical ownership of I/O buffers.

Coupled with these initiatives is a new mechanism for software to interrogate status updates as described below. Previously, this was provided exclusively via interruption. In this way the present invention enables interrogation across queues (multiple priorities) under control of a timer and, as described earlier, in periods of low activity, interrupts are provided and then when activity reaches a certain threshold, control is switched to use the timer.

The interface must be designed to establish a cooperative environment with the Upper Layer Protocols or the ULPs such that the cost to the ULP of executing I/O is minimized. Cost reduction techniques for both small and large data packets must be designed into the interface. Besides the obvious costs of I/O in terms of instructions per operation, there exists a set of other costs related to but not directly measured against the cost of the current structures. These may be generally described as the price I/O users pay in their own code base to either avoid or minimize the measurable cost of I/O. If one could have a zero impact I/O structure, a ULP would be free to optimize for its environment rather than conform to rules determined by an I/O structure.

In the present invention a new controller area is defined, and during the initialization time, a numeric value is passed to ULP ENABLE which specifies the amount of buffer space needed to build a header required by the adapter, preferably a GigaEnet adapter. A connection manager will then pass this value to all ULP's that wish to utilize the adapter, and during data flows, all datagrams sent will have that amount of storage between the header and the datagram. This methodology removes the need for allocating storage in the data path or adapter header placement which in turn will affect the overall system throughput. In addition the present invention provides for the sharing of network attachment with each ULP owning its own device address.

Important Instructions

The present invention provides for several novel instructions and commands that does not exist in the present technology. The first of these is called a Signal Adapter Instruction, hereinafter SIGA instruction. The SIGA instruction comes in several flavors such as a read, a write, and a synchronize SIGA. The command is primarily established to give operational initiative that is missing from the existing systems. The SIGA instruction works almost like a wake-up call, reminding the system to go and check its queues and process what is pending. It functions as a mid-I/O intrusion instruction that is designated for the checking of the queues. It is an I/O operational signal structure which in case of its synchronization flavor, synchronizes the data in the queues to ensure the state information is pushed out and the queues are processed. It can be initiated by a program timer if desired.

In a preferred embodiment of the present invention, the SIGA comprises an eight bit function code and if called for, a 32 bit parameter is transmitted to the adapter. The following is an example of a SIGA structure.

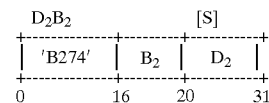

General register 0 contains the function code which specifies the operation to be performed by the adapter. General register 1 contains the subsystem-identification word, which designates a QDIO subchannel by implication and the QDIO adapter that is to be signaled. Depending on the specified function code, general register 2 contains a 32 bit parameter. The definition and purpose of this parameter depends on the function code. When the function code specifies either (1) initiate-output queues, or (2) initiate-input queues, general register 2 specifies which input or output queues are to be processed by the adapter.

Function Code 0/Initiate Output—When the function code specifies initiate-output, the associated QDIO adapter is signaled to asynchronously process one or more output queues associated with the specified subchannel. In this case, the instruction is referred to as SIGA-w (SIGNAL ADAPTER—write). The output queues that are to be processed are specified in general register 2.

Function code 1/Initiate Input—When the function code specifies initiate-input, the associated QDIO adapter is signaled to asynchronously process one or more input queues associated with the specified sub-channel. In this case, the instruction is referred to SIGA-r or Signal Adapter read. The input queues that are to be processed are specified in general register 2.

Function code 2/Synchronization—When the function code specifies synchronize, the virtual machine is signaled to update the data queues SLSB and SBAL entries in order to render them current as observed by both the program and the QDIO adapter. In this case, the instruction is referred to as SIGA-s or Signal Adapter synchronize.

SIGA-s is required in virtual machine models where QDIO data queue sharing between the program and the adapter is simulated by the use of separate unshared copies of the queues SLSB and SBAl components. One copy of these components is used by the program and one copy is used by the adapter. The execution of SIGA-s signals the virtual machine to update these unshared copies for the data queues as necessary so that both the program and the QDIO adapter observe the same contents for these queues components.

When SIGA-s is specified:
1) The output queues for the designated subchannel that are to be synchronized are specified in general register 2.
2) All input queues for the designated subchannel are synchronized.
3) The QDIO adapter is not signaled.
4) The virtual machine is signaled if the program is executing in a virtual machine environment. No virtual machine signal is generated when the program is not executing in a virtual machine.

For the SIGA-w and SIGA-r and SIGA-s functions, the second operand ($B_2D_2$) is ignored.

When the SIGA-r and SIGA-w or SIGA-s functions are specified, general register 2 specifies a 32 bit parameter that designates which input or output queues are to be processed by the adapter. Bits 0 through 31 correspond one for one with input or output queues 0 through 31 respectively and are called queues indicators QI. Additionally, both input and output queues are prioritized by queue number with the lowest numbered queue (queue 0) having the highest priority and the highest numbered queue (queue 31) having the lowest priority.

When a queue indicator is one and the corresponding queue is valid, the QDIO adapter is signaled to process the corresponding input or output queues. When a queue indicator is one and the corresponding input or output queue is invalid, the queue indicator is ignored.

A queue is valid when it is established and is active. A queue is invalid when it is not established, is not active, or the model does not allow a queue to be established for the corresponding queue indicator.

When the queue indicator is zero, no action is required to be taken at the adapter for the corresponding queues. When all queues indicators in general register 2 are zero, the adapter is not signaled and no other operation is performed.

Subsequent to the execution of SIGA, the QDIO adapter associated with the designated subchannel performs the specified function. When the SIGA-w function is specified, the adapter processes each specified output queue in priority sequence. For each queue that contains queue-buffers in the primed state, the data in the buffers is transmitted and upon completion of transmission, the queue buffers are placed into the empty state. This process continues until the data in all primed output queue buffers, for all specified output queues, has been transmitted.

When the SIGA-r function is specified, the adapter processes each specified input queue in priority sequence. For each queue that contains queue-buffers in the input buffer empty state, data is placed into the queue buffers as it is received and upon completion of the transmission, the queue buffers are placed into the input buffer primed state. This process continues for each empty queue buffer in sequence until a buffer that is not in the input buffer empty state is reached. This process is then repeated for the next lower priority input queue. If any queue buffers for all specified input queues have been filled with data.

Shared State Interface Control

Another important aspect of the present invention is its ability to share state interface. The Shared State Interface Control or SSIC function that provides shared state interface between the QDIO adapter and a QDIO program, such as a multipath channel program, can best be described in the following diagram:

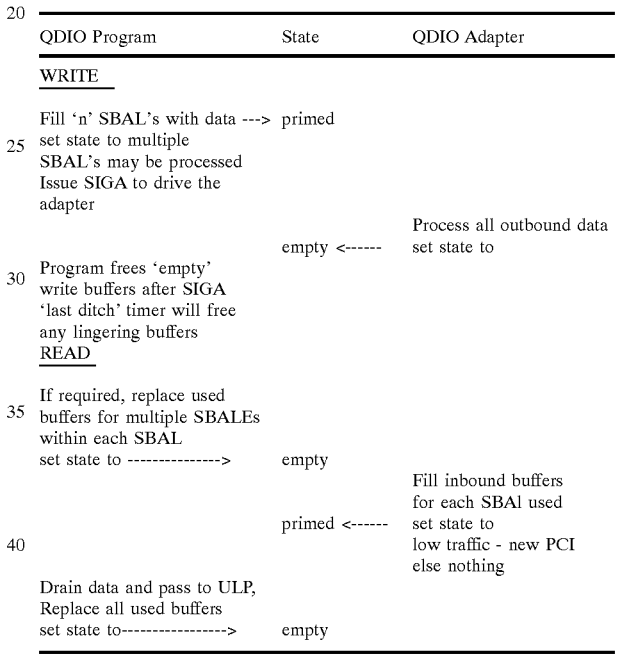

II. Store Subchannel QDIO Data or CHSC Command

Input/output operations for QDIO involve the use of an I/O device represented by a subchannel in the channel subsystem. The proper execution of QDIO I/O operations depends on certain characteristics of the subchannel. Examples of such characteristics are:
   whether the subchannel supports QDIO operations
   the format of the queues
   the number of input and output queues
   I/O-device requirements regarding program issuing of the SIGA instruction.

The store-subchannel-QDIO-data command provides the program with a way to determine from the channel subsystem the QDIO characteristics (listed above) that the program must take into account in order to perform I/O operations using a specified subchannel. Previous mechanisms that allow programs to determine operational characteristics of I/O devices normally consist of the program executing a channel program to obtain such information from the I/O device.

By providing the store-subchannel-QDIO-data command, it is possible for I/O devices to have different QDIO characteristics and for the program to determine what those characteristics are prior to communicating with the I/O device itself.

The CHSC command is used to obtain self description information for the QDIO adapters associated with a specified range of subchannels. When the CPC is operating in a mode where several images are used, the CHSC command is used to obtain self description information for the QDIO adapters associated with a specified range of subchannel images, configured to the logical partition that executed the command information for subchannel images configured to other logical partitions, if any, is not provided. FIG. 5 represents the format for the command request block for store-subchannel-QDIO data. FIG. 6 represents the format for the command response block for the store-subchannel-QDIO data command. In addition, FIG. 6 includes Subchannel-QDIO description Block.

In short the CHSC command specifies which device the request for processing can be sent to. It further provides for the format and attributes of the QDIO, such as the size and attribute of the queues, and other characteristics that may relate to the specific processor. QFMT or QDIO Queues Format and QDIOAC or QDIO Adapter characteristics in the Subchannel-QDIO description Block of FIG. 6 includes this information. IQCNT of the Sunchannel-QDIO description Block provides the Input Queues Count and OQCNT also of the Subchannel-QDIO description Block provides an Output Queue Count.

III. QDIO Priority Instructions

The user can issue a request leading to a SETUP_REQ instruction. When processing this instruction a device address will be assigned to the user which will be passed along via a SETUP SDU instruction. The SETUP primitive will also pass priority queue information to the adapter. The format of this is shown in FIG. 4. Length is defined by Length of DIF including this field. Category is defined as the value of primitive specific. Type denotes the value of data path device address. DEV_CUA is a multi-digit CUA in packed format. DEV_NO. refers to the device number assigned to this ULP's connection. Priority Service Order is the order by which the adapter will service the queues. It is used to provide a favorable service for higher priority vs. lower priority queues. Maximum Service Limit Units refer to the units that are used under a favored treatment based on the amount of outbound data allowed to be processed during one processing interval. It can be defined in three flavors: maximum number of packets to be transmitted—counts packet size without regard to packet size; maximum number of bytes allowed to be transmitted; and maximum number of SBALs that may be transmitted—without regard to number of packets or amount of data within the SBAL. Maximum Service Unit Priority provides the number of units on a priority basis.

Data Packing

Data packing is another important feature that is affected by the present invention. As the cost of I/O decreases, the need to prorate traffic to reduce the cost per data element decreases. However, the need still exists and the present design will allow for a multi-path channel or MPC to perform data packing through the device driver code which "unpacks" packed data received from the ULPs directly into a Storage_Block_Address_List array so that packed format data is not handled directly. This approach is taken because packed data resides in slower memory than the Storage_Block_Address_Lists array provides. In addition, data packing for small objects is supported and non-contiguous headers for large objects is supported within a single data queue. In this context a non-contiguous header implies the use of a single entry for a network or control headers. A preferred ULP to be supported is TCP/IP which will build upon existing packing algorithms to reduce cost of I/O by continuing to pro-rate the cost across multiple datagrams. When an MPC is used, the device driver code will unpack the datagrams into the Storage_Block_Address_List arrays. To provide for the efficient flow of large data objects, unpacked datagrams will also be supported but the criteria upon whether a given flow is to be packed or not depends upon the size of the packet. To further optimize the system when TCP/IP is used, TCP/IP will include a controller work area, preferably a 32 byte header, and the start of the datagram for all data transfers. In all cases the controller area, if specified, must be provided by the ULP as part of any network or control header. This includes single datagram transfers where network headers, any control header, any defined data header and the user data have been moved to form a continuous bit stream. Headers must also be supplied when non-continuous header datagrams are used. MPC will not insert the header on behalf of the ULP. Note that an SBALE or a Storage_Block_Address_List_Element is also defined, preferably with a 4k page limit to allow attachment of the Queued Direct I/O to different switches such as fiber optic switches and International Business Machine's ESCON switch (ESCON is a registered trademark of IBM Corp. of Armonk).

Another problem that severely impacts current systems is the lack of an efficient gather/scatter function. Since data chaining is exposed to the remote partner, it is no longer efficient for network communications. Yet data movements within the server continue to be major performance inhibitors for mid-size or large data objects. This problem is resolved by inventing an out-of-band header(s) such that the user data need not be moved or copied in construction of the data stream.

The problems with system dispatching is also minimized by establishing a common user interface such that the user can assist in dispatch control. When an MPC is used, the MPC will establish a Direct Queue Area or a DQA for each ULP exploiting the network attachment. This area will be used to control the queuing of inbound data as well as provide the control structure to be used for dispatching options and processing.

The present invention has enhanced the existing system support for high performance applications that wish to take advantage of high speed media attach. Intent is to minimize inbound dispatching by providing a set of optional mechanisms that bypass the traditional SRB dispatch from disabled code that occurs during current I/O disabled completion. Since there is no change of ownership required for such protocols such as TCP/IP, the recovery procedure will no longer be needed in many instances. Also, no assigned buffers (ASSIGN BUFFER) are required for inbound traffic (TCP/IP). The data will not be blocked by the MPC or multipath channel and the interface layer will perform the deblocking function itself. Since MPC is not deblocking into smaller datagrams, there is no need for an assign buffer. The operation is driven by a disable timer during mid-high traffic rates, and all inbound queues for all interfaces will be processed via the timer mechanism, and fast interrupt indicators will be set off for all read data paths. This in turn will eliminate the need for some inbound dispatching functions like the use of MPC supplied Direct Queue Area. The ULP will include a user area for specific processing and the SBAL format will include the addresses and lengths of input data. A new function, IUTIL CM_ACT is also provided that will contain fast dispatching (FAST DISPATCH) which in turn will allow the ULP to optimize its own environment.

Dynamic Configuration

In the existing systems, all Gateway-types of attachments need to have a configuration file defined which identifies various items. These items include the following:

1) Host Device Address—this definition is needed to define the Host Number and Host Unit address, especially when multiple or virtual images/machines are being used when passing data across any channel interface. This information is needed by the channel subsystem to determine which Host connection is to receive the incoming data. It is also needed for each Host or Host Unit Address which is to be used to transfer data across the channel interface to an adapter.

2) Host Application—This identifies which Host Application is using the Host device Address.

3) Application Specific Address—This address is used to identify the specific Application Server to which the inbound data received from the LAN is to be routed. Each Application Specific Address is directly related to the Host Device Address and Host Application.

4) LAN Port Number—this identifies which LAN Port is to be used for sending data which is received at the Gateway from the Host Device Address.

5) Default Routes—these are defined on a Host Application basis. Each Host Application can have a default Host Device Address specified. This Host Device Address is used to send all traffic received from the LAN for a specific Host Application for which an Application Specific Address has not been defined. For example, if a TCP/IP packet is received from the LAN and the TCP/IP address found in the packet was not defined in the configuration file, this packet would be sent to the Host over the Host Device Address defined by the Default Route entry.

6) Setting Thresholds for Priority Traffic—this defines the percentages of processing which should be used on the various priority traffic. For example, this command could be used to define the maximum number of bytes which should be processed for a specific priority before moving on the check for work for a different priority.

The present invention changes all that. All configuration information defined above is no longer needed in the configuration file. In fact, the configuration file is no longer required on the Gateway attachment using the QDIO Interface. All the information is presented to the Gateway device at initialization time through various tables and commands which are passed over the channel interface.

A table is provided which maps all the Host images and Host Device Addresses which will be using the QDIO Interface to the specific bits defined in the SIGA vector. This list is derived directly from the information defined in the IOCDS on the Host. Each entry in the IOCDS which defined an ADIO device causes an entry to be placed in the initial table. At initialization time, each entry in the table is assigned a specific bit in the SIGA vector. Also, at any time after initialization, this information can be dynamically changed and Host Device addresses can be added and/or deleted.

The Host Application which is to use the Host Device Address is defined using a command called MPC_ENABLE-IC Command. The Application Specific Address is defined using the SETIP command. The Application Specific Address can also be deleted using the DELIP command. The LAN Port Number is specified in the STRT-LAN Control Command. The Default Routes are defined using the SETRTG Control Command. This is a new control command defined specifically in the present invention. Setting thresholds for priority traffic is defined using the SETPRIORITYTHRESHOLD Control command which defines the maximum number of bytes which can be processed for a specific QDIO Priority QUEUE before checking for work on the other QDIO Priority QUEUES. This command allows the user to tailor each individual system for its specific application requirements.

Using this and the queue priority instructions the specific algorithm which is to be used when servicing each of the different priority queues is addressed. Each Host Device has the ability to set its own unique priority algorithm.

SIGA Vector Implementation

The SIGA Vector is needed to give initiative to the QDIO connected Gateway device. One problem which is solved by the present invention is the use of Priority Queues and how a priority algorithm which needed to serve multiple priority queues at the specified priority values. In other words, certain queues represented by the SIGA Vector needed to be completely serviced on each invocation because they were the highest priorities. Each queue at the next lowest priority needed to have the ability to have some of its traffic left pending if its thresholds for service were reached. The higher priority queues then needed to be rechecked if more work had come active while the lower priority queues still had work pending.

To accomplish the above task, the SIGA Vector is split into a priority bit mask. Each Device Address which was assigned to the QDIO interface had one queue assigned for each of the possible priorities. In one embodiment of the present invention, there are four bits assigned to each of the different Device Addresses. When a certain priority work request needs to be sent, the bit corresponding to the Device Address and its corresponding priority is set. As requests come in from different priorities or from different Device Addresses, their bits would also be set. This gives the Host System the ability to five multiple different work requests in the same SIGA Mask.

Another problem addressed is the effective service of various QDIO priorities when only a single bit is being used to signal the Gateway device work. Since it is possible that all the work for a certain priority would not be serviced before checking back for more work for the other priorities, the Gateway device needed to be able to remember the current work, but be able to go back and look for more new work. To do this, the Gateway device would write a specific value into the SIGA Vector area after each read of the vector. Once the Host code detected the value written by the Gateway device, the vector would be completely cleared and then new work requests were added. Clearing of the vector after each read enables the fairness algorithms so the different priorities could be processed at their desired rates.

One additional problem to be addressed is the number of bits which is needed to be scanned to identify the work requests. In one embodiment of the present invention, there are a possibility of 240 Device Addresses. Each Device Address has 4 priorities, so this computes to 4*240 or 960 possible bit settings. The overhead of scanning all these bits to find the work requests is too high. To make the searching faster, the 960 bits are split into 30 different 32-bit masks. When a new work request is added, the bit in one of the 30 different 32-bit masks is set. Also, the bit in the Work Vector which corresponds to the 32-bit mask in which the bit was set is also set.

The work vector which identified the specific 32-bit mask made finding the bits which were set much more efficient.

The Gateway device can now scan the Work Vector to find the appropriate 32-bit mask. The Gateway device can then just fetch the proper 32-bit mask to find the work request.

In one embodiment of the present invention, all high priority traffic is handled completely and then the amount of data processed from the other queues is assigned a weight using the SETPRIORITYTHRESHOLD command. Once the lower priority queues have been handled, it is possible some data could be residual in these queues. It then becomes necessary to go back and check the priority queues if new requests have arrived. To make sure only new requests have been added to the List when it is refetched, each time the adapter reads the SIGA Vector, it sets a field to indicate the vector has been read. The next Host request will then see the adapter has read the SIGA Vector. It is then completely cleared by the Host code before setting the new request.

Error Reporting During Run Time—Non Catastrophic

As data is being transferred across the QDIO interface to and from the Gateway device, it is possible for errors to periodically occur in the data stream. Intermittent errors can be recovered. Errors which become persistent need to be detected so the interface can be taken down and then restarted. All this needs to happen at run time and require no user interventions.

To accomplish this, Error States are defined for the SLSB Status Block. When the adapter detects errors in the data stream, an error state is set in the SLSB. The specific reason for the error is stored in the SBALF (SBAL Flags) which are located in the SBAL which is associated with the SLSB that has the error state set. Using this approach, the Host is able to monitor the number of errors which occur within a specified time period. If the number of errors exceeds the pre-determined threshold which has been set, the QDIO Connection is terminated. If the error rate stays under the specific threshold, the connection will remain active.

Concurrent Patch

Concurrent Patch is a feature provided in QDIO. The Concurrent Patch feature allows the customer to install a new level of microcode to the adapter without interrupting any of the applications and/or services using the adapter. For Channel adapters this was not a major problem because all of the applications using the channel adapter did not require any connection-type of information to be kept across the code update.

For the Network Adapters which are using TCP/IP, the adapter contains information about each client station in the LAN and each connection which is present with the Host Applications. The connections are active once the adapter is activated and remain present while the card is active. There are no Gateway platforms today which will keep the TCP/IP sessions active during a code update. The QDIO Hydranet adapter is the first to offer the Concurrent Patch feature in a Gateway environment.

QDIO in Virtual-machine Environment

The key control mechanism for QDIO is the storage-list-state block (SLSB), comprising a vector of state entries for each queue, with one entry per storage-block-address list (SBAL). An SBAL contains the addresses of a set of storage blocks within main memory, the collection of which is termed a buffer, either input or output.

Each SLSB entry represents a finite-state machine (FSM), an automaton well known in the art, defining the states of a computing process, the inputs and outputs of the process for each state, and the allowed transitions among the states. Whereas a standard FSM is executed by a single process, the FSM in an SLSB entry in this invention is shared and used as a control and communication mechanism by a host program on the one hand and by an I/O adapter on the other. The FSM is used by each to drive the other. The set of states of the FSM is strictly divided into two subsets, program-owned states and adapter-owned states. The ownership is indicated by bits within the encodings of the state-values. Each side exchanges ownership with the other to cause control and processing to pass between them.

Thus, the FSM of an SLSB entry embodies two sets (one each in the program and the adapter) of one or more processes under the control of the FSM definition. These sets of processes are kept separate and carefully controlled through the two distinct subsets of FSM states, implying ownership by one side or the other, as described above. However, within either side (program or adapter), multiple processes may share and be controlled by the FSM. Such sharing processes within a given side may use the state-values within its own side's ownership subset to control and communicate with other processes on its own side, but not the other side. That is, neither side is permitted to understand or act upon the meaning of a specific state-value that is owned by the opposite side, other than to transfer ownership according to the FSM definition. This strict separation of the program and the adapter within the FSM ensures that each side can be a free-running process (or set of processes) through the entire set of FSMs in an SLSB without the possibility of deadlock.

Within the preferred implementation, there are separate FSM definitions for input and output queues. The five FSM states for input queues are as follows:

input buffer not initialized (program owned)
input buffer empty (adapter owned)
input buffer primed (program owned)
input buffer error (program owned)
input buffer halted (program owned)

The five FSM states for output queues in the preferred implementation are as follows:

output buffer not initialized (program owned)
output buffer empty (program owned)
output buffer primed (adapter owned)
output buffer error (program owned)
output buffer halted (program owned)

FIGS. 7 and 8 depict sample Input and Output queues as relating to this particular area as will be discussed below. With the FSM in each SLSB entry being executed cooperatively but independently by the program and the adapter, the processing of an entire input or output queue is accomplished by sequentially cycling through the full set of FSMs (and, hence, buffers) within the SLSB controlling the queue.

The following control mechanisms is an abstract, simplified version of the preferred implementation for the proper sequencing through the buffers.

Output Queues:

Program
-------
Current_Entry = 1;
   LOOP:  DO WHILE Current_State = ˆPRIMED AND
             data output exists;
             Execute FSM for Current_Entry;
             Current_Entry = Current_Entry +
             1 modulo SLSB_Size;
             END;

-continued

```
                WAIT (for more data from application or Current_State
                change);
                GO TO LOOP;
Adapter
-------
        Current_Entry = 1;
        LOOP:   DO WHILE Current_State =
                PRIMED;
                Execute FSM for Current_Entry;
                Current_Entry = Current_Entry +
                1 modulo SLSB_Size;
                END;
                WAIT (for SIGA-w signal);
                GO TO LOOP;
Input Queues:

Program
        -------
        Current_Entry = 1;
        LOOP:   DO WHILE Current_State = ^EMPTY;
                Execute FSM for Current_Entry;
                Current_Entry = Current_Entry +
                1 modulo SLSB_Size;
                END;
                WAIT (for PCI or timer interruption);
                GO TO LOOP;
        Adapter
        -------
        Current_Entry = 1;
        LOOP:   DO WHILE Current_State = EMPTY AND input data
                exists;
                Execute FSM for Current_Entry;
                Current_Entry = Current_Entry +
                1 modulo SLSB_Size;
                END;
                WAIT (for more data, SIGA-r signal, or Current_State
                change);
                GO TO LOOP;
```

These control mechanisms (i.e., the FSMs and the sequencing logic to loop through the FSMs in an SLSB) keep the program and the adapter in synchronism with each other without deadlock as the cooperating processes on each side move in tandem through different portions of the SLSB. The invariant conditions are that each side always processes FSM states not processed by the other, and as data is moved inbound or outbound, each side sets FSM states processed by the other. As long as one side is running, it sets states that will be processed by the other side, and vice versa.

The QDIO protocol so far described is extended in the present invention to be used in a virtual-machine environment through minor additions along with careful design and attention to the following considerations.

A key aspect of QDIO is the shared-memory model by which the program and the adapter share a common queue structure and data areas in a computer's main memory. With the free-running cooperative processes described above, controlled by a set of FSMs in an SLSB for each data queue, the use of shared memory avoids the processor and channel-subsystem overhead of start-processing and one-for-one interruptions associated with traditional input/output operations.

Such a shared-memory model is problematic in the environment of a virtual machine, which is an image of a real machine created by a program called a virtual-machine hypervisor. The apparent real storage of the virtual machine is in fact pageable storage of the hypervisor. The adapter, lacking dynamic-address-translation (DAT) capability and the hypervisor's associated DAT tables, needs to know the actual real-storage addresses of the queue structures and data.

The shared-memory model of the QDIO protocol is simulated by the virtual-machine hypervisor through the use of "shadow" copies of key control blocks that are maintained by the hypervisor. The QDIO control-block structure is designed in such a way as to carefully separate and isolate main-memory addresses from non-address information.

Among the QDIO control blocks, the storage list (SL) and storage-block-address list (SBAL) are designed specifically to contain addresses needed by the adapter. The queue-information block (QIB) and the storage-list-information block (SLIB) are designed specifically to exclude any such addresses. The memory pages containing the QIB and the SLIB are fixed in main memory by the hypervisor and, thus, follow the QDIO shared-memory model: the program accesses the QIB and the SLIB using addresses that are in fact virtual, while the adapter accesses these same control blocks with real addresses.

The SLs and SBALs are shadowed by the hypervisor. The SLSB is also shadowed, although it contains no addresses, because of its definition as the controlling mechanism for the program's and the adapter's cooperating processes. The changing of FSM states in the SLSB controls the program's and the adapter's access to the other queue components that require address translation, and hence, FSM state-changes must be gated and controlled by the hypervisor using the shadow-block mechanism.

The QDIO protocol is started by the existing START SUBCHANNEL (SSCH) machine instruction in the preferred implementation, but could be started by one or more new instructions defined for the purpose. For pageable virtual machines, SSCH is intercepted by the hypervisor so as to begin the simulation of the QDIO protocol. During the simulation of the Establish-QDIO-Queues channel command, the hypervisor builds shadow copies of the SL, SBAL, and SLSB control blocks. The queue-descriptor record (QDR) associated with the Establish-QDIO-Queues command contains the main-memory addresses of the QDIO queue components as seen by the program. The hypervisor translates those addresses, as well as addresses within the SL and SBALs, in building its own copy of the QDR and the shadow SL and SBALs. Translation of addresses within the SBALs may be delayed until the simulation of the Activate-QDIO-Queues channel command if the program chooses to defer its data-buffer assignments until the queues are activated.

Once the QDIO protocol is started, the virtual-machine hypervisor needs to intervene to perform address translation whenever the program presents a new set of empty or full buffers to the adapter for inbound or outbound data, respectively. The hypervisor also intervenes when synchronization is needed between the program's original SLSB and the hypervisor's shadow SLSB used by the adapter. Such address translation and SLSB synchronization is implicit during the hypervisor's interception of program-controlled interruptions (PCIs) and the SIGA-w and SIGA-r instructions. The SIGA-s instruction causes hypervisor intervention when there is no signal needed between the program and the adapter in the non-virtual-machine environment, but there is nevertheless a need for address translation and SLSB synchronization for the virtual machine. In the preferred implementation, SIGA-s is used by the program when recovering emptied outbound buffers from the adapter and after a program timer expires to signal the need for checking of SLSB states on input queues.

The previously-described FSM definitions and sequencing protocols for the SLSB support and make possible the operation of QDIO in virtual machines. The concept of ownership of SBALs and data buffers, as embodied in the separate program-owned and adapter-owned states of the FSMs, means that the adapter never accesses main memory for which the adapter does not have ownership within the applicable FSM. Ownership is only transferred from program to adapter by the setting of an adapter-owned state in the FSM by the program and the subsequent synchronization of the program's FSM with the adapter's shadow FSM by the hypervisor, after the hypervisor performs the necessary address translation. Likewise, ownership is only transferred from adapter to program by the setting of a program-owned state in the FSM by the adapter and the subsequent synchronization of the real and shadow FSMs, after the hypervisor updates the applicable real SBALs from the shadow SBALs with, for example, the actual data count moved through the adapter.

The mutually-exclusive FSM-state subsets between the program and the adapter, with the rule of each side setting ownership by the other side to transfer processing between them, enables straight forward synchronization of the real and shadow SLSBs by the hypervisor. The hypervisor maintains a "hidden shadow" copy of the SLSB to reflect the state of the SLSB at the previous synchronization point. This permits easy recognition of changes made by the program to the real SLSB and by the adapter to the shadow SLSB, allowing the proper updates in each direction between the real and shadow SLSBs with one pass through the three copies of the SLSB at each synchronization point.

The mutually-exclusive FSM-state subsets and the sequencing rules through the SLSB entries further support virtualization by ensuring that synchronization by the hypervisor does not disrupt or interfere with concurrent operations by the program and the adapter on their respective copies of the SLSB. The boundaries between program-owned and adapter-owned states constantly move downward through the SLSB and back to the top. Neither side looks beyond its own contiguous set(s) of owned FSMs, with the boundaries being apparent. This means the method of synchronization by the hypervisor, whether top-down, bottom-up, or middle-to-middle in either direction, can have no lasting effect of disrupting the program's or the adapter's operation.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. In a network environment having a main storage, a queuing method for receipt and transfer of incoming and outgoing data comprising the steps of:
   providing a plurality of queue sets in said main storage;
   dedicating one or more queues in each set as input queues;
   dedicating one or more queues in each set as output queues;
   providing the ability to said queues to share access to a plurality of devices in said network across a plurality of communication stacks;
   mapping various resources to said queues to facilitate resource allocation and dynamic configuration by providing initialization of a plurality of configuration parameters; and
   providing dynamic expanding and contracting of the number of queues in each set as dictated by traffic patterns and feedback indicators.

2. The method of claim 1, further comprising the step of providing an interrupt free any outbound traffic.

3. The method of claim 1, further comprising the step of providing ability to allow for interrupts for any inbound traffic.

4. The method of claim 3, wherein said mechanism allows for selective use of interrupts.

5. The method of claim 4, wherein said selection of interrupts is established by considering an adaptive rate between said interrupts and a polling rate so that any inbound interrupts can only take place during low data rates.

6. The method of claim 1, wherein said queuing mechanism is a Queued Direct I/O (QDIO) facility.

7. The method of claim 1, wherein said main storage is in processing communication with an Interface Element having at least one I/O adapter.

8. The method of claim 7, wherein a running program in said environment can directly access data placed into said input queues by means of said adapter(s) of said Interface Element.

9. The method of claim 8, wherein said data placed into said input queues can originate from one or more I/O devices or network of devices capable of connecting to said adapter.

10. The method of claim 1, wherein a running program in said environment can transmit data directly to said adapter by placing data into the appropriate output queues.

11. The method of claim 10, wherein any data placed into said output queues may be selectively used internally by said adapter.

12. The method of claim 10, wherein any data placed into said output queues may be selectively transmitted to one or more I/O devices capable of connecting to said adapter.

13. The method of claim 8, wherein a direct adapter storage interface is provided to minimize interrupts in any running programs.

14. The method of claim 1, wherein said queuing mechanism is kept separate and distinct from any data control traffic.

15. The method of claim 1, wherein 240 queue sets are provided.

16. The method of claim 1, wherein each queue set in said mechanism provides for 4 outbound and at least one inbound queue.

17. The method of claim 16, wherein a plurality of applications are running in said environment and each application is assigned to at least one queue set.

18. The method of claim 17, wherein each queue set can share one or more adapters.

19. The method of claim 1, wherein each queue sets provide for a list of useable buffers and also a list of storage blocks for incoming/outgoing data.

20. The method of claim 19, wherein said buffers are further prioritized to address specific application needs.

21. The method of claim 20, further comprising the step of initiating queues at initialization time for each application (s).

22. The method of claim 21, further comprising the step of subsequently initiating queues when a desired or required change is to be performed.

23. The method of claim 21, wherein any change is being updated at intervals.

24. The method of claim 22, wherein any change is being made dynamically and continuously.

25. In a network environment having a main storage, a queuing apparatus for receipt and transfer of incoming and outgoing data comprising the steps of:
   a plurality of queue sets provided in said main storage;
   at least one queue in each set dedicated as input and as output queues;
   said queues being set up to dynamically expand and contracting of the number of queues in each set as dictated by traffic patterns and feedback indicators;
   access a mechanism allowing said queues to share access to a plurality of devices in said network across a plurality of communication stacks;
   mapping facility to allow mapping of various resources to said queues to facilitate resource allocation and dynamic configuration by providing initialization of a plurality of configuration parameters.

* * * * *